United States Patent
Ichinose et al.

(10) Patent No.: US 7,529,366 B2
(45) Date of Patent: May 5, 2009

(54) BLOCK ENCODING/DECODING METHOD, CIRCUIT, AND DEVICE

(75) Inventors: Tsutomu Ichinose, Tochigi (JP); Iwao Oofuji, Kanagawa (JP); Nobutane Hideshima, Kanagawa (JP)

(73) Assignee: Sony Corporation, Tokyo (JP)

( * ) Notice: Subject to any disclaimer, the term of this patent is extended or adjusted under 35 U.S.C. 154(b) by 669 days.

(21) Appl. No.: 10/497,109

(22) PCT Filed: Sep. 25, 2003

(86) PCT No.: PCT/JP03/12234

§ 371 (c)(1),
(2), (4) Date: Sep. 30, 2004

(87) PCT Pub. No.: WO2004/032097

PCT Pub. Date: Apr. 15, 2004

(65) Prior Publication Data

US 2005/0031123 A1   Feb. 10, 2005

(30) Foreign Application Priority Data

Oct. 4, 2002   (JP) .............................. 2002-291949

(51) Int. Cl.
*H04L 9/00* (2006.01)
*G06F 12/14* (2006.01)

(52) U.S. Cl. ............................ 380/29; 380/37; 713/189

(58) Field of Classification Search ...................... None
See application file for complete search history.

(56) References Cited

U.S. PATENT DOCUMENTS

| 5,008,935 A | * | 4/1991 | Roberts ....................... 380/29 |
| 6,708,273 B1 | * | 3/2004 | Ober et al. .................. 713/189 |
| 2002/0083317 A1 | * | 6/2002 | Ohta et al. ................... 713/161 |

* cited by examiner

*Primary Examiner*—Brandon S Hoffman
(74) *Attorney, Agent, or Firm*—Oblon, Spivak, McClelland, Maier & Neustadt, P.C.

(57) ABSTRACT

A variable-length block encryption circuit having a simplified structure and that reduces the load on a host computer. A plaintext memory and an encryption/decryption circuit for encrypting or decrypting original data in blocks. The original data is transferred to the plaintext memory from the exterior. The transferred original data is supplied to the encryption/decryption circuit and is subjected to encryption or decryption in blocks. The result data is substituted for the original data in the plaintext memory. When all transferred original data is substituted, the result data is externally output.

16 Claims, 6 Drawing Sheets

BLOCK ENCODING/DECODING METHOD, CIRCUIT, AND DEVICE

TECHNICAL FIELD

The present invention relates to a method, circuit, and apparatus for block encryption/decryption.

BACKGROUND ART

In methods for encrypting plaintext data, block encryption in which plaintext is enciphered block by block, one block being, for example, 64 bits, is known. This block encryption can be classified into four modes, depending on how a block and key are used: ECB, CBC, OFB, and CFB.

Figure 5:
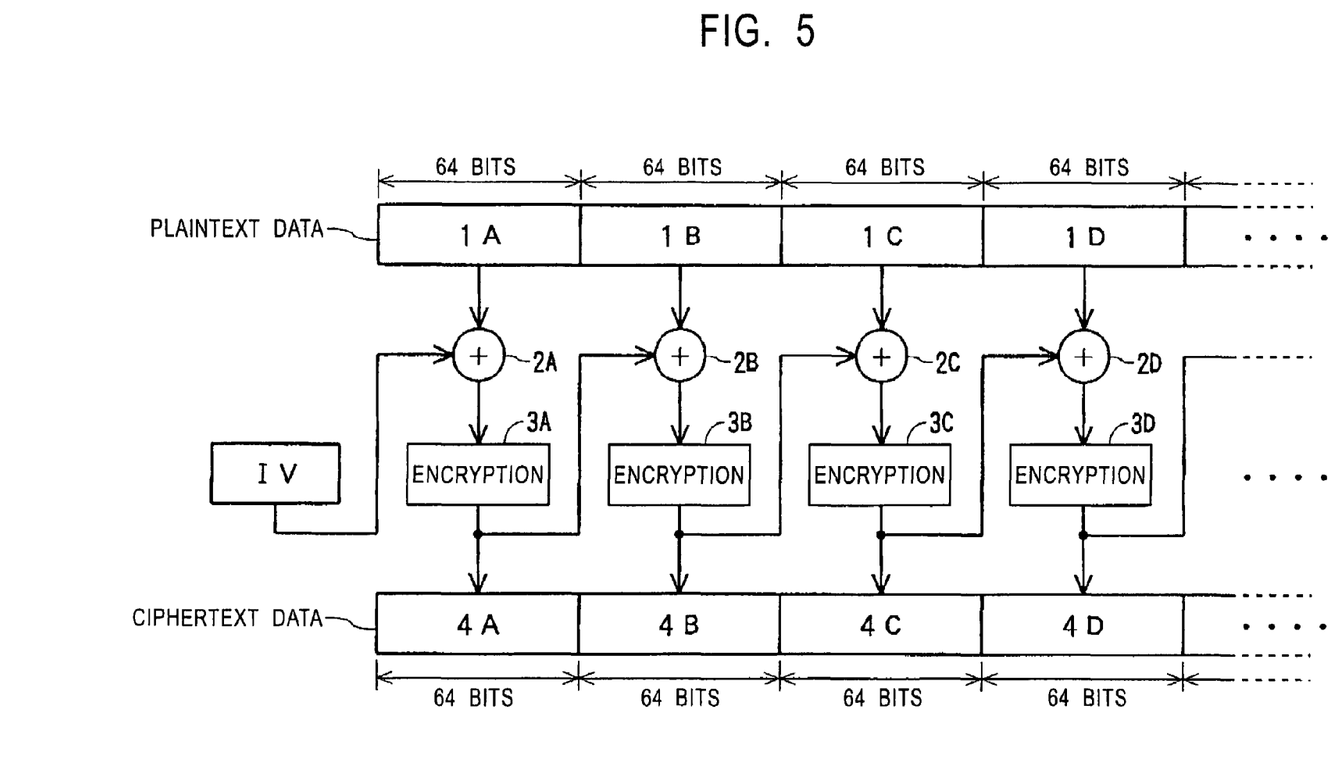
FIG. 5 is a system diagram for explanation of the present invention.

The CBC mode entails block chaining encryption. FIG. 5 shows a block encryption circuit in CBC mode, focusing on the data flow.

A first block 1A of plaintext data and an initial value (initialization vector) IV are supplied to an exclusive-OR circuit 2A. An output therefrom is supplied to an encryption circuit 3A and is then encrypted into a first block 4A of ciphertext data using a secret key. A second block 1B of plaintext data and the first block 4A of ciphertext data are supplied to an exclusive-OR circuit 2B. An output therefrom is supplied to an encryption circuit 3B and is then encrypted into a second block 4B of ciphertext data using the secret key. A third block 1C of plaintext data and the second block 4B of ciphertext data are supplied to an exclusive-OR circuit 2C. An output therefrom is supplied to an encryption circuit 3C and is then encrypted into a third block 4C of ciphertext data using the secret key.

Likewise, an nth block of plaintext data is XORed with an (n−1)th block of ciphertext data, which is the previous block's ciphertext result. An XORed output is encrypted into an nth block of ciphertext data using the secret key. (See, for example, Japanese Unexamined Patent Application Publication No. 2000-338866.)

Figure 6:
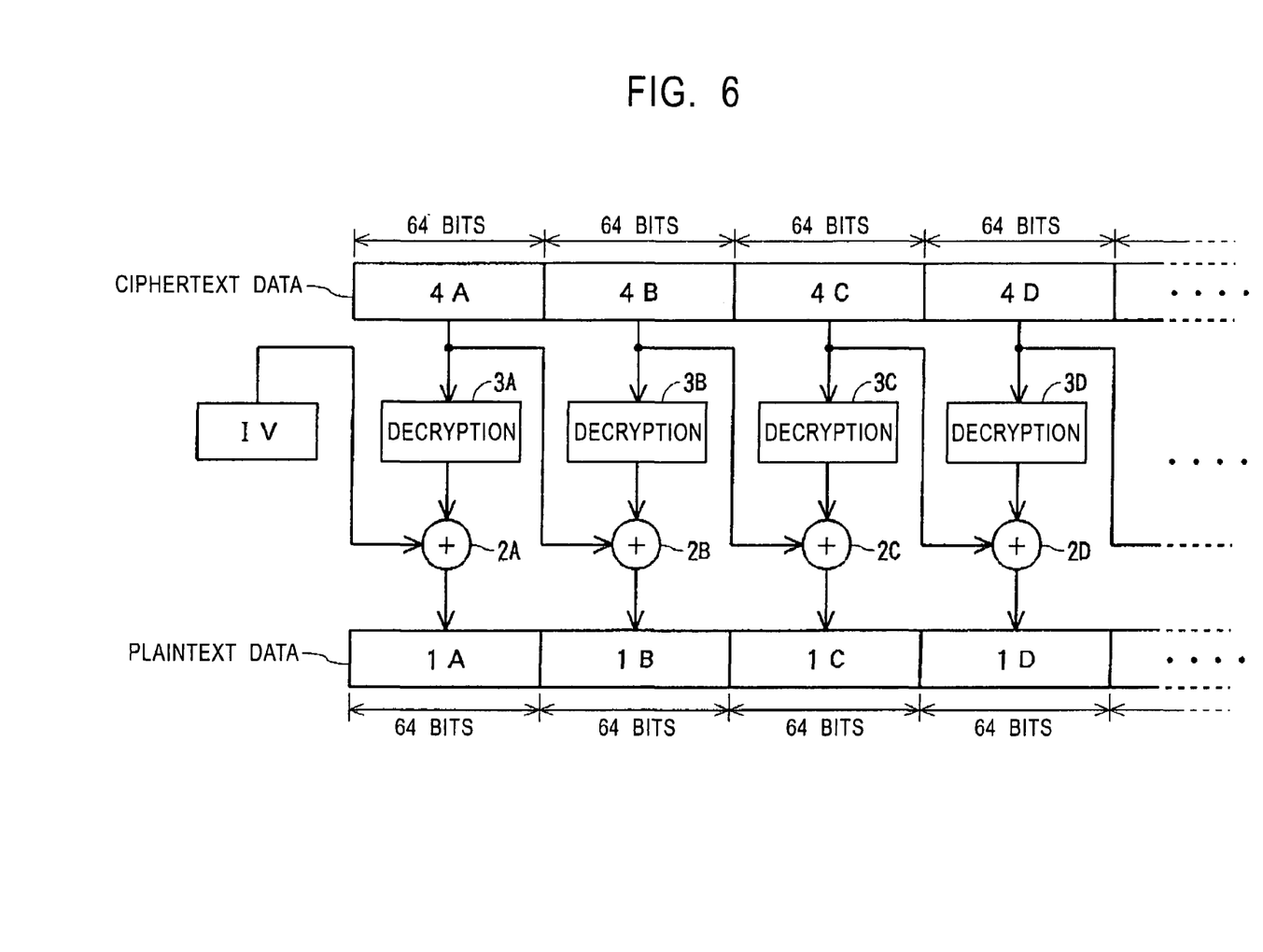
FIG. 6 is a system diagram for explanation of the present invention.

In this way, according to the block encryption circuit shown in FIG. 5, plaintext data can be encrypted in CBC mode. If the signal flow shown in FIG. 5 is reversed and the circuits 3A, 3B, 3C, . . . are used for decryption, ciphertext data can be decrypted into plaintext data, as shown in FIG. 6.

FIG. 5 focuses on the data flow. In practice, in the block encryption circuit, the exclusive-OR circuits 2A, 2B, 2C, . . . are realized by software processing in a host computer using this block encryption circuit, and the encryption circuits 3A, 3B, 3C, . . . consist of hardware. Only one circuit is provided in actuality and is shared for the blocks 1A, 1B, 1C, . . . of plaintext data and the blocks 4A, 4B, 4C, . . . of ciphertext data.

Changing processing of the exclusive-OR circuits 2A, 2B, 2C, . . . or the like achieves block encryption in ECB mode or the like, and therefore, the processing of the exclusive-OR circuits 2A, 2B, 2C, . . . or the like is also called mode processing.

For commercial disks on which digital audio data including musical data is recorded, it has been suggested that the digital audio data be encrypted before being recorded on disks in order to prevent unauthorized duplication. In this case, the block encryption described with reference to FIG. 5 can be applied.

Since the block encryption circuit shown in FIG. 5 performs mode processing including exclusive-OR processing in blocks of, for example, 64 bits, a large amount of plaintext data (digital audio data) places a heavy load on a computer. For instance, 2K-byte plaintext data requires a computer to perform mode processing 256 times. (=2K bytes/64 bits). This results in a significant burden being placed on the computer.

Therefore, a player for playing back a disk whose data is subjected to block encryption needs another microcomputer for decryption, in addition to a microcomputer for system control, or needs a high-performance microcomputer that can perform both system control and encryption.

In light of the foregoing, the present invention provides a block encryption circuit with a simple structure that can handle any length of plaintext data without placing a heavy burden on a computer.

DISCLOSURE OF INVENTION

In the present invention, for example, a circuit for block encryption includes: a memory for storing plaintext data; encrypting means for encrypting the plaintext data stored in the memory in blocks and transferring the encrypted data to the memory in blocks; and outputting means for externally outputting the encrypted data when the data that is encrypted in blocks and is transferred to the memory reaches a predetermined size exceeding the block length.

Accordingly, a host computer sends or receives plaintext data or ciphertext data in units equal to the capacity of a plaintext memory.

BEST MODE FOR CARRYING OUT THE INVENTION

1. Structure and Processing of Block Encryption Circuit

Figure 1:
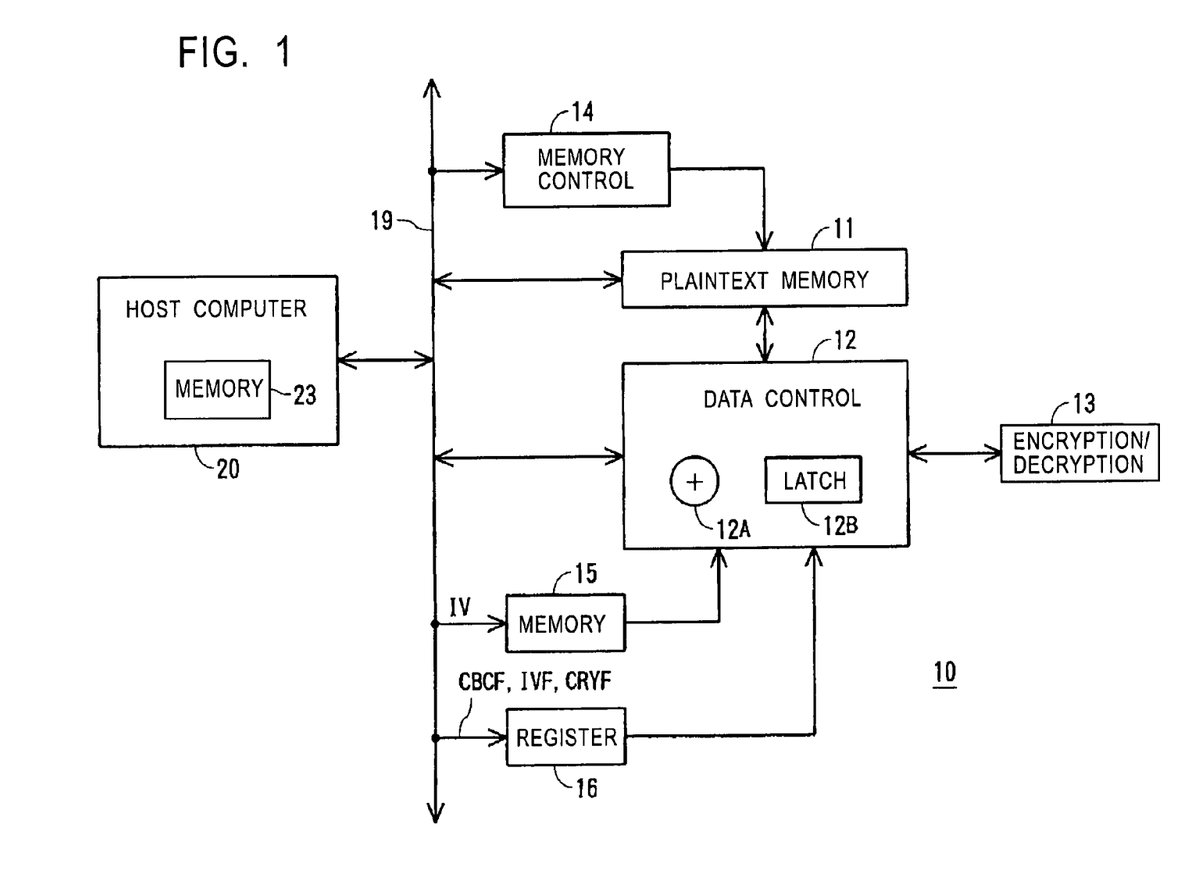
FIG. 1 is a system diagram of an embodiment of the present invention.

In FIG. 1, reference numeral 10 denotes the overall block encryption circuit according to the present invention and reference numeral 20 denotes a host computer using the block encryption circuit 10.

The block encryption circuit 10 has a plaintext memory 11, a data control circuit 12, and an encryption/decryption circuit 13. In this case, the plaintext memory 11 is used for holding plaintext data and ciphertext data until encryption or decryption is completed, and has a capacity corresponding to a plurality of plaintext data blocks, for example, a 2K-byte (=64 bits×256 blocks) capacity.

The data control circuit 12 has an exclusive-OR circuit 12A corresponding to the exclusive-OR circuit 2A shown in FIG. 5, and a latch circuit 12B. The encryption/decryption circuit 13 corresponds to the encryption circuit 3A of FIG. 5 and is a general-purpose block encryption circuit. It encrypts input data block by block. The encryption/decryption circuit 13 is also used for decryption of ciphertext data.

The block encryption circuit 10 has a memory control circuit 14, an initial value memory 15, and a register 16. In this case, the memory control circuit 14 writes and reads data to and from the plaintext memory 11, and controls addresses therefor. The initial value memory 15 holds an initial value IV supplied by the host computer 20. The register 16 holds a mode flag CBCF, an IV flag IVF, and an encryption flag CRYF.

The mode flag CBCF is used for switching between CBC mode and ECB mode in encryption/decryption: for carrying out encryption/decryption in the CBC mode, CBCF is set to "1"; and for carrying out encryption/decryption in the ECB mode, CBCF is set to "0". The IV flag IVF is used for controlling the use of the initial value IV for performing encryption/decryption: for performing encryption/decryption on the first block of plaintext/ciphertext data (when the initial value IV is used), IVF is set to "1"; and for performing encryption/decryption on the second and subsequent blocks (when the initial value IV is not used), IVF is set to "0". For encryption, CRYF is set to 1"; for decryption, CRYF is set to "0".

The encryption/decryption circuit 13 is connected to the data control circuit 12. The circuits 11, 12, and 14 to 17 are connected to the host computer 20 over an internal bus 19 of the block encryption circuit 10. The host computer 20 has a memory 23 in which plaintext data to be encrypted or ciphertext data to be decrypted is prepared. The amount of this plaintext data or ciphertext data may be greater than the capacity of the plaintext memory 11. If the plaintext data or ciphertext data is not an integral multiple of 64-bit blocks, the data is made an integral multiple with dummy data added at the end.

Figure 2:
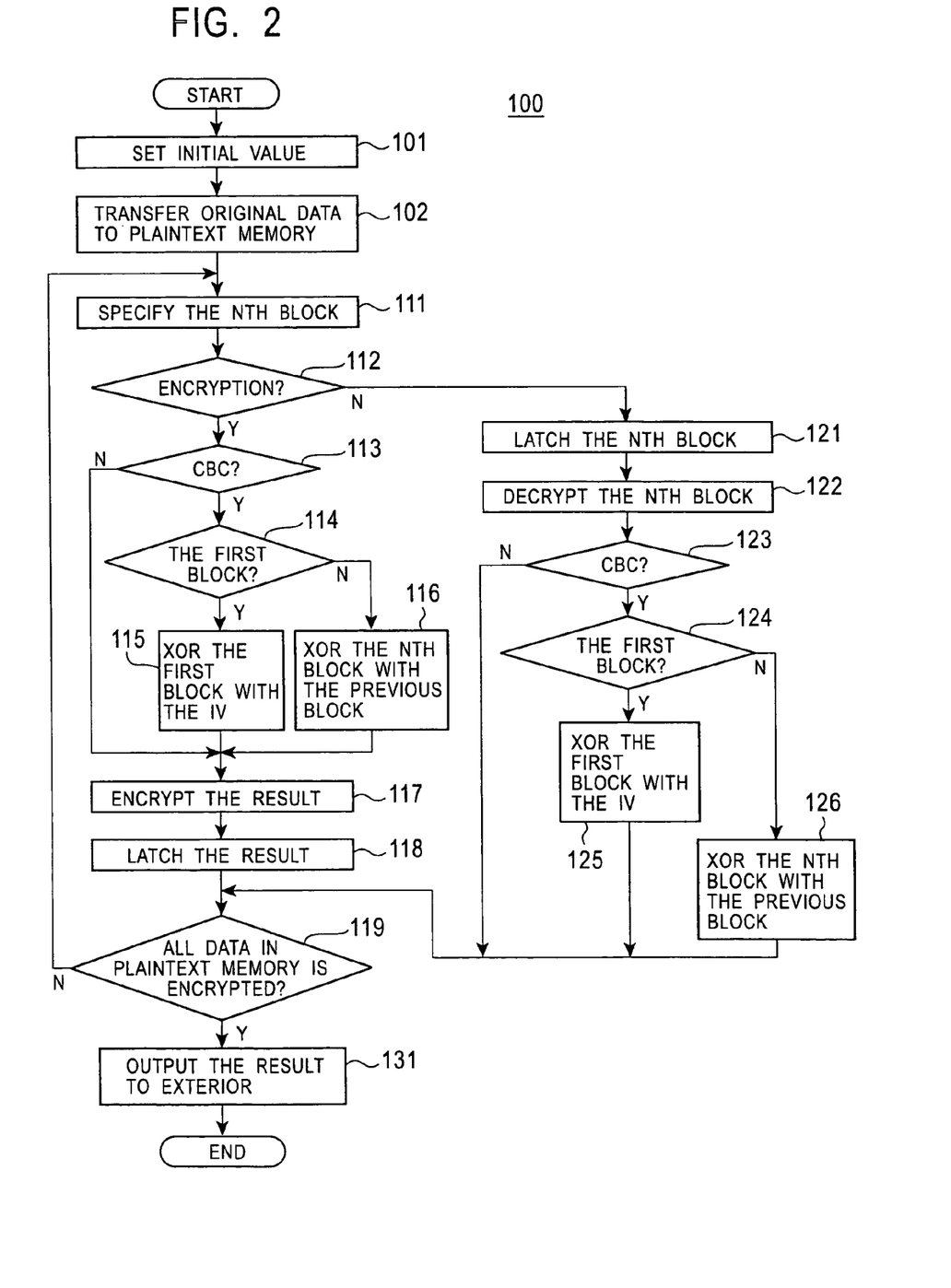
FIG. 2 is a flowchart of processing of a circuit shown in FIG. 1.

The block encryption circuit 10 encrypts or decrypts the plaintext data or ciphertext data prepared in the memory 23 of the host computer 20, following the process of, for example, flowchart 100 shown in FIG. 2. This will now be described below.

1-1 Encryption in CBC Mode

For encryption of plaintext data by using the block encryption circuit 10 in CBC mode, as shown in step 101 of the flowchart 100, the host computer 20 loads an initial value IV into the initial value memory 15 and also loads the flags CBCF, IVF, and CRYF, which are all "1", into the register 16. Then, as shown in step 102, the first 2K bytes of data of the plaintext data prepared in the memory 23 is transferred to the plaintext memory 11. This transfer is performed by DMA transfer of the memory control circuit 14.

Then, as shown in step 111, an nth block, a first block in this case, of the plaintext data in the plaintext memory 11 is specified. As shown in step 112, the data control circuit 12 refers to the encryption flag CRYF and thus determines whether encryption or decryption processing is intended. In this case, CRYF is "1", indicating encryption; the processing continues from step 112 to step 113.

As shown in step 113, the data control circuit 12 refers to the mode flag CBCF of the register 16 so that it is determined whether the operation mode of the encryption is the CBC mode or the ECB mode. In this case, CBCF is "1", indicating the CBC mode; the processing continues from step 113 to step 114. As shown in step 114, the IV flag IVF is referred to so that it is determined whether or not a block specified in step 111 is the first block of the plaintext data in the plaintext memory 11.

When the block is determined to be the first block (when IVF is "1"), the processing goes from step 114 to step 115. In step 115, the nth block that is specified in step 111, the first block in this case, and the initial value IV that is loaded to the initial value memory 15 in step 101 are supplied to the exclusive-OR circuit 12A. The IVF is then reset to "0", and therefore, after the first block, processing goes from step 114 to step 116.

In step 114, when the block specified in step 111 is determined to be the second or subsequent block (when IVF is "0"), the processing goes from step 114 to step 116. In step 116, the nth block of data that is specified in step 111 and the previous (n−1)th block's encrypted data are supplied to the exclusive-OR circuit 12A. In this way, in step 115 or step 116, an XORed output is produced.

The processing goes from step 115 or 116 to step 117. In step 117, the XORed output in step 115 or step 116 is supplied to the encryption/decryption circuit 13 so that the output is encrypted into ciphertext data and substituted for the original block of plaintext data in the plaintext memory 11. Then, as shown in step 118, the ciphertext data block in step 117 is latched into the latch circuit 12B. This latched XORed output is used in step 116 as the previous (n−1)th block data, as described above.

Then, as shown in step 119, it is determined whether all blocks in the plaintext memory 11 have been subjected to the encryption in step 117. If there is an unencrypted block left, the processing goes back to step 111 from step 119. In this way, the plaintext data in the plaintext memory 11 is encrypted into ciphertext data block by block.

When all blocks in the plaintext memory 11 have been subjected to encryption in step 117, the processing goes from step 119 to step 131. In step 131, produced ciphertext data in the plaintext memory 11 is transferred to the memory 23 of the host computer 20. This transfer is also performed by DMA transfer of the memory control circuit 14.

As described above, the first 2K bytes of data of the plaintext data prepared in the memory 23 of the host computer 20 is encrypted. Therefore, the processing of the flowchart 100 stops. If the plaintext data prepared in the memory 23 is more than 2K bytes, and thus, there is a plaintext data component that is not encrypted, the processing of the flowchart 100 is performed on the plaintext data component again.

1-2 Encryption in ECB Mode

For encryption in ECB mode, plaintext data prepared in the host computer 20 is subjected to processing as in the flowchart 100, except that loading an initial value IV into the initial value memory 15 in step 101 is not performed. A mode flag CBCF to be loaded into the register 16 is set to "0".

The processing in the flowchart 100 goes from step 113 to step 117; XOR processing of the exclusive-OR circuit 12A is not carried out, and only an nth plaintext data block is encrypted by the encryption/decryption circuit 13. In this way, ciphertext data in ECB mode is achieved.

1-3 Decryption in CBC Mode

For decryption of ciphertext data by using the block encryption circuit 10 in CBC mode, as shown in step 101 of the flowchart 100, the host computer 20 loads an initial value IV from the memory 23 into the initial value memory 15 and also loads the flags CBCF and IVF, which are "1", and the encryption flag CRYF, which is "0", into the register 16.

Then, in step 102, the first 2K bytes of data of the plaintext data prepared in the memory 23 of the host computer 20 is transferred to the plaintext memory 11, and an nth block (n=1 in this case) of the transferred data is specified. Then, in step 112, the data control circuit 12 refers to the encryption flag CRYF and thus determines whether encryption or decryption processing is intended. In this case, CRYF is "0", indicating decryption; the processing continues from step 112 to step 121.

In step 121, the nth block specified in step 111 of the ciphertext data in the plaintext memory 11 is latched into the latch circuit 12B and, as shown in step 122, is then supplied to the encryption/decryption circuit 13. Therefore, the nth block ciphertext data is decrypted into plaintext data (plaintext data before XOR processing). The latched block by the latch circuit 12B is used as the previous (n−1)th block when the nth block of decrypted data is XORed, as described below.

The processing continues to step 123, and the data control circuit 12 refers to the mode flag CBCF of the register 16 so that it is determined whether the operation mode of the decryption is the CBC mode or ECB mode. In this case, CBCF is "1", indicating the CBC mode; the processing continues from step 123 to step 124. In step 124, the IV flag IVF is referred to so that it is determined whether or not the block specified in step 111 is the first block of the ciphertext data in the plaintext memory 11.

When the block is determined to be the first block (when IVF is "1"), the processing goes from step 124 to step 125. In step 125, the plaintext data block that is decrypted in step 122 and the initial value IV that is loaded into the initial value memory 15 in step 101 are supplied to the exclusive-OR circuit 12A to become original plaintext data. This plaintext data is substituted for an original ciphertext data block in the plaintext memory 11. At this time, IVF is reset to "0".

In step 124, when the block specified in step 111 is determined to be the second or subsequent block (when IVF is "0"), the processing goes from step 124 to step 126. In step 126, a plaintext data block that is decrypted in step 122 and a previous (n−1)th block that is latched into the latch circuit 12B in step 121 are supplied to the exclusive-OR circuit 12A to become original plaintext data. This plaintext data is written into the position of its original ciphertext data block in the plaintext memory 11.

Then, as in the case of the encryption described in Section 1-1 above, the processing continues to step 119 and subsequent steps. The ciphertext data in the plaintext memory 11 is decrypted block by block. After the completion of decryption on all blocks in the plaintext memory 11, the resulting plaintext data is transferred to the memory 23 of the host computer 20.

If there is undecrypted ciphertext data remaining in the memory 23 of the host computer 20, the above processing is performed again. After all ciphertext data prepared in the memory 23 of the host computer 20 is decrypted, the all processing finishes.

1-4 Decryption in ECB Mode

In decryption of ciphertext data prepared in the host computer 20, loading an initial value IV into the initial value memory 15 in step 101 is not performed and flags CBCF and CRYF to be loaded into the register 16 are set to "0".

The processing in the flowchart 100 continues from step 123 to step 119. Therefore, without being subjected to XOR processing by the exclusive-OR circuit 12A, an nth block of plaintext data is substituted for original ciphertext data in the plaintext memory 11. In this way, plaintext data in ECB mode is achieved.

1-5 Summary

As described above, block encryption of plaintext data (and block decryption of ciphertext data) are carried out. In this case, access to the block encryption circuit 10 for plaintext data by the host computer 20 is required only in units equal to the capacity of the plaintext memory 11, thus reducing the load on the host computer 20.

Specifically, the encryption circuit shown in FIG. 5 requires the host computer to send plaintext data and receive ciphertext data in 64-bit blocks. Therefore, a large number of times for the sending and receiving places a heavy load on the host computer. The block encryption circuit 10 shown in FIG. 1, on the other hand, requires the host computer 20 to send plaintext data and receive ciphertext data only in 32 blocks of 2K bytes. The number of times for the sending and receiving is significantly reduced to 1/256th (=64 bits/2K bytes) that in the circuit of FIG. 5, thus reducing the load on the host computer 20. In addition, the length of time required for encryption in the host computer 20 is shortened.

The host computer 20 does not perform processing, such as block XORing or block management, between sending plaintext data to the block encryption circuit 10 and receiving ciphertext data from the block encryption circuit 10. This also reduces the load on the host computer 20, thus allowing the host computer 20 to concentrate on essential processing. For example, in a CD player or the like including the circuit of the present invention, a computer for system control, functioning as the host computer 20, can focus on processing for system control. Therefore, devices, in particular portable devices, do not require computers for system control to achieve high performance.

Additionally, the amount of plaintext data to be encrypted is not required to be an integral multiple of the capacity of the plaintext memory 11, and therefore, any amount of plaintext data is made available for encryption. A variable-length block encryption circuit is thus achieved. The encryption/decryption is done in units equal to the capacity of the plaintext memory 11 so that the influence of transmission errors in chaining encryption is reduced. Furthermore, in order to achieve the above advantageous effects, no special circuit is needed.

2. Recording/Playback Device

Figure 3:
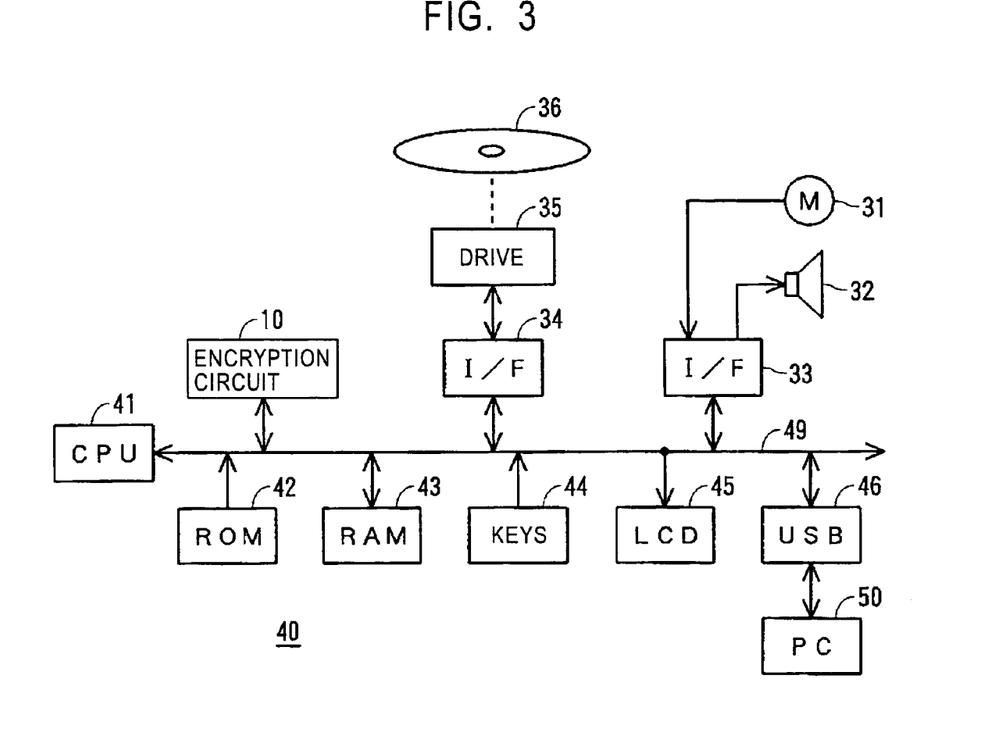
FIG. 3 is a system diagram of an embodiment of the present invention.

FIG. 3 shows an embodiment of a CD-R/RW recording/playback device to which the present invention is applied.

In recording requiring no encryption and decryption, an audio signal is supplied from a signal source, such as a microphone 31, to an interface circuit 33 and is A/D converted to digital audio data. The digital audio data is supplied to a disk interface circuit 34 over a system bus 49 of a microcomputer 40 described below and is subjected to encoding for error correction and EFM processing for recording. After being encoded and modulated, the signal is supplied to a disk drive unit 35 and is then recorded on a disk 36, such as a CD-R or a CD-RW.

In playback, a signal from the disk 36 is reproduced by the disk drive unit 35 and is supplied to the disk interface circuit 34. This reproduced signal is then subjected to processing complementary to that of recording, i.e., demodulation of EFM signals and decoding for error correction to retrieve the original digital audio data. This retrieved digital audio data is supplied to the interface circuit 33 over the system bus 49 and is D/A converted to an analog audio signal. This analog audio signal is then supplied to a predetermined unit that is the destination of the signals, such as a speaker 32.

Recording or reproducing of digital data other than digital audio data on or from the disk 36 requires another encoding or decoding, which is also performed by the disk interface circuit 34.

The microcomputer 40 functions as a system control circuit for controlling the overall operation of this recording/playback device, and has a CPU 41, a ROM 42 in which various programs and data are written, and a RAM 43 used for a work area. The CPU 41, the ROM 42, and the RAM 43 are connected to the system bus 49. The block encryption circuit 10 described in Section 1 above is connected to the system bus 49 over the internal bus 19. An address area, which is a portion of the RAM 43, is used as the memory 23.

User interfaces including operational keys 44 and a display, such as an LCD 45, are also connected to the system bus 49. The system bus 49 is connected to a USB interface circuit 46 as an external interface. This USB interface circuit 46 is connected to an external device, such as a personal computer 50.

With audio signals, recording involving encryption and reproducing involving decryption will now be described below.

2-1 Encryption and Recording of Audio Signals

To encrypt an audio signal and record it on the disk 36, the audio signal is supplied from the microphone 31 to the interface circuit 33 and is A/D converted to digital audio data. This digital audio data is buffered in the RAM 43 and is then supplied to the block encryption circuit 10. The digital audio data in the RAM 43 is encrypted into encrypted data blocks by the block encryption circuit 10 in, for example, 2K-byte units, as described in Section 1 above.

The encrypted data in the RAM 43 is then supplied to the disk interface circuit 34 and is subjected to encoding for error correction and EFM processing for recording. Then, it is supplied to the disk drive unit 35 and is recorded on the disk 36.

2-2 Reproducing and Decryption of Audio Signals

To decrypt and reproduce an audio signal recorded on the disk 36, a signal is reproduced from the disk 36 by the disk drive unit 35. This reproduced signal is supplied to the disk interface circuit 34 and is decoded so that the original encrypted data is retrieved. The encrypted data is buffered in the RAM 43 and is supplied to the block encryption circuit 10 in, for example, 2K-byte units, thereby decrypting the data to the original audio data blocks, as described in Section 1 above.

The decrypted digital audio data is supplied from the RAM 43 to the interface circuit 33 and is then D/A converted to the original analog audio signal. This analog audio signal is then supplied to, for example, the speaker 32.

2-3 Re-Encryption of Encrypted Data

This is when an encrypted audio signal recorded on, for example, the disk 36 is decrypted and is then encrypted again using another secret key so that re-encrypted ciphertext data is output to the personal computer 50. The following is when decrypted digital audio data is encrypted again in 4K-byte units. In this case, the CPU 41 executes, for example, a routine 200 shown in FIG. 4.

Figure 4:
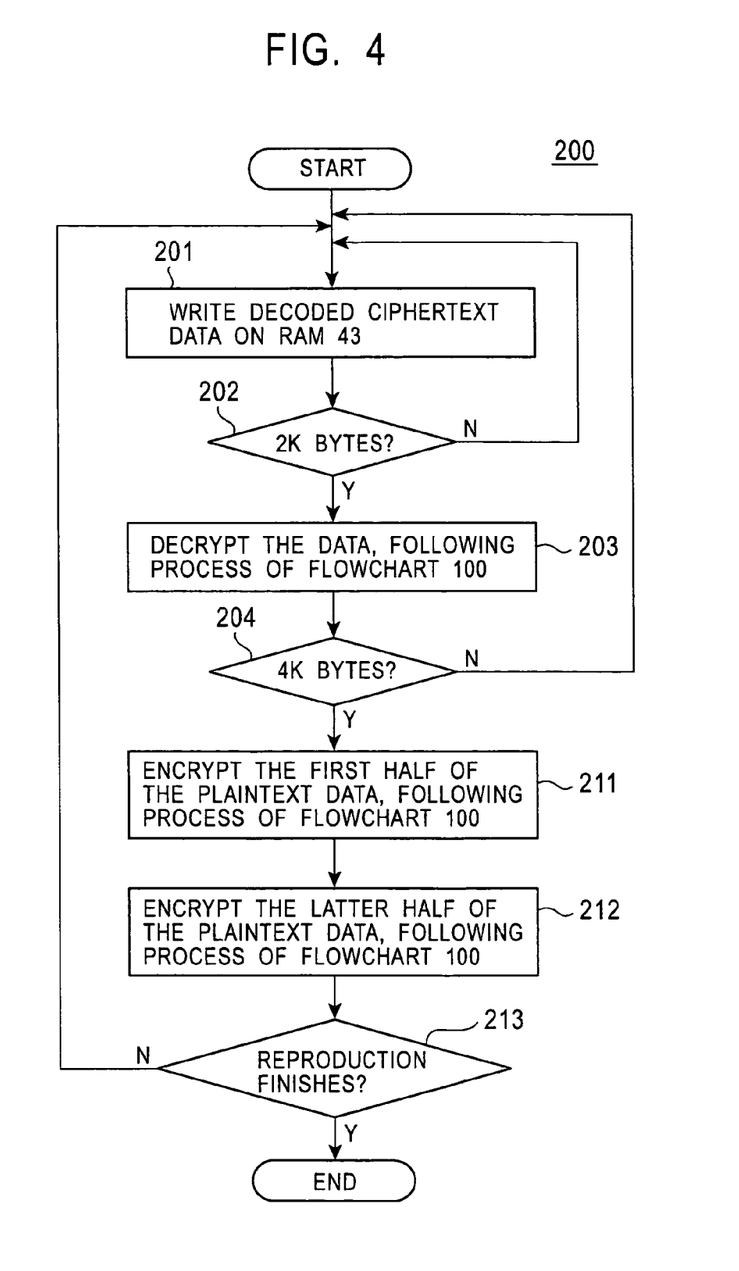
FIG. 4 is a flowchart of processing of a circuit shown in FIG. 3.

When playback of the disk 36 is started, as in the case of Section 2-2 above, a reproduced signal from the disk 36 is decoded to original ciphertext data by the disk interface circuit 34 and is output. In step 201, the ciphertext data is sequentially written in the RAM 43. In step 202, it is determined whether the amount of written ciphertext data in the RAM 43 reaches 2K bytes. If not, writing of ciphertext data in the RAM 43 in step 201 continues.

If the amount of written ciphertext data in the RAM 43 reaches 2K bytes, processing by the CPU 41 proceeds from step 202 to step 203. In step 203, the processing follows the process of the flowchart 100, and therefore, the ciphertext data in the RAM 43 is decrypted into plaintext data (digital audio data). Then, in step 204, it is determined whether the amount of plaintext data in the RAM 43 reaches 4K bytes. If not, the processing goes back to step 201. In this way, ciphertext data that is reproduced from the disk 36 is sequentially written in the RAM 43, and the written ciphertext data is decrypted into plaintext data (digital audio data) in 2K-byte units.

If the amount of plaintext data in the RAM 43 is determined to reach 4K bytes in step 204, the processing proceeds from step 204 to step 211. In step 211, the processing follows the process of the flowchart 100, and therefore, the first-half 2K bytes of plaintext data in the entire 4K bytes of plaintext data in the RAM 43 is encrypted into ciphertext data.

Then, the processing goes to step 212. In step 212, the processing follows the process of the flowchart 100 again, and therefore, the latter-half 2K bytes of plaintext data in the entire 4K bytes of plaintext data in the RAM 43 is encrypted into ciphertext data. In this case, the execution of the process of the flowchart 100 in step 212 does not include an initialization of step 101, but instead uses the flags CBCF, IVF, and CRYF in the process of the flowchart 100 in step 211 without changing their values.

In step 213, it is determined whether the playback of the disk 36 has finished. If not, the processing continues back to step 201 from step 213, and the processing in step 201 and subsequent steps is performed again. As a result, the RAM 43 acquires re-encrypted ciphertext data in 4K-byte units; the re-encrypted ciphertext data is supplied to, for example, the personal computer 50 via the USB interface circuit 46.

In this way, an audio signal that is recorded on the disk 36 after being encrypted is re-encrypted and is output to the personal computer 50. It is apparent from the flowchart 200 that the microcomputer 40 performs processing on ciphertext data or plaintext data only in 2K-byte units so that the processing is done in real time during the playback of the disk 36.

3. Other

In the flowchart 100, when there is plaintext data left in the memory 23 upon the completion of the processing in step 131, the processing may go back to step 102 and repeat the processing in step 102 and subsequent steps.

LIST OF ABBREVIATIONS AND ACRONYMS USED IN THE SPECIFICATION

A/D: Analog to digital
CBC: Cipher block chaining
CD: Compact disc
CD-R: Recordable CD
CD-RW: Rewritable CD
CFB: K-bit cipher feedback
CPU: Central processing unit
D/A: Digital to analog
DMA: Direct memory access
ECB: Electronic code book
EFM: Eight to fourteen modulation
K: 1024
LCD: Liquid crystal display
OFB: K-bit output feedback
RAM: Random access memory
ROM: Read only memory
USB: Universal serial bus

INDUSTRIAL APPLICABILITY

According to the present invention, a host computer accesses an encryption circuit for sending or receiving plaintext data or ciphertext data only in units equal to the capacity of a plaintext memory. Therefore, the load on the host computer is significantly reduced. In addition, the length of time required for encryption in the host computer is shortened.

Since the host computer does not perform processing, such as block XORing or block management, between sending plaintext data to the encryption circuit and receiving ciphertext data from the encryption circuit, the load on the host computer 20 is reduced, thus allowing the host computer to concentrate on essential system control processing.

Moreover, any amount of plaintext data is made available for encryption, and therefore, a variable-length block encryption circuit is achieved. The encryption/decryption is done in units equal to the capacity of the plaintext memory so that the influence of transmission errors in chaining encryption is reduced. Furthermore, in order to achieve the above advantageous effects, no special circuit is needed.

Audio signals that are recorded on a disk after being encrypted can be re-encrypted and output externally. Since the host computer performs processing on ciphertext data or plaintext data only in units equal to the capacity of the plaintext memory, the processing is advantageously achieved in real time.

The invention claimed is:

1. A method for block encryption comprising:
   transferring plaintext data stored in a first memory to a second memory;
   loading to an initial value memory an initial value;
   loading into a register a mode indication indicating a mode of encryption to be executed on the plaintext data and an initial value flag indicating whether a block of the plaintext data is an initial block;
   transferring the plaintext data from the second memory to an encryption circuit, through a data control circuit, in blocks of predetermined length;
   transferring the initial value from the initial value memory to an exclusive-OR circuit in the data control circuit, and transferring the mode indication and initial value flag from the register to a latch in the data control circuit;
   encrypting the plaintext data in the encryption circuit in blocks of predetermined length based on the transferred initial value, the transferred mode indication, and the transferred initial value flag;
   transferring the encrypted data to the second memory; and
   transferring the encrypted data to the first memory when the encrypted data stored in the second memory reaches a predetermined size exceeding the block length.

2. The method for block encryption according to claim 1, wherein the predetermined size is an integral multiple of the block length.

3. The method for block encryption according to claim 2, wherein the plaintext data is transferred from the first memory to the second memory in units equal to the integral multiple of the block length.

4. The method for block encryption according to claim 1, wherein the encrypting is performed after the plaintext data divided into blocks is subjected to an operation on the basis of the loaded initial value data or the previous block's encrypted data.

5. A method for block decryption comprising:
   transferring encrypted data stored in a first memory to a second memory;
   loading to an initial value memory an initial value;
   loading into a register a mode indication indicating a mode of encryption executed on the encrypted data and an initial value flag indicating whether a block of the plaintext data is an initial block;
   transferring the encrypted data from the second memory to a decryption circuit, through a data control circuit, in blocks of predetermined length;
   transferring the initial value from the initial value memory to an exclusive-OR circuit in the data control circuit, and transferring the mode indication and initial value flag from the register to a latch in the data control circuit;
   decrypting the encrypted data in the decryption circuit in blocks of predetermined length based on the transferred initial value, the transferred mode indication, and the transferred initial value flag;
   transferring the decrypted plaintext data to the second memory; and
   transferring the plaintext data to the first memory when the plaintext data stored in the second memory reaches a predetermined size exceeding the block length.

6. The method for block decryption according to claim 5, wherein the predetermined size is an integral multiple of the block length.

7. The method for block decryption according to claim 6, wherein the plaintext data is transferred from the second memory to the first memory in units equal to the integral multiple of the block length.

8. The method for block decryption according to claim 5, wherein the decrypting is performed after the plaintext data divided into blocks is subjected to an operation on the basis of the loaded initial value data or the previous block's decrypted data.

9. A circuit for block encryption comprising:
   a memory for storing plaintext data;
   an initial value memory storing an initial value;
   a register storing a mode indication indicating a mode of encryption to be executed on the plaintext data and an initial value flag indicating whether a block of the plaintext data is an initial block;
   a data control circuit including an exclusive-OR circuit that receives the initial value from the initial value memory and a latch that receives the mode indication and the initial value flag from the register;
   an encrypting circuit that encrypts the plaintext data stored in the memory in blocks based on the initial value, the mode indication, and the initial value flag, received at the data control circuit, and transferring the encrypted data to the memory in blocks;
   outputting means for externally outputting the encrypted data when the data that is encrypted in blocks and is transferred to the memory reaches a predetermined size exceeding the block length.

10. The circuit for block encryption according to claim 9, wherein the predetermined size is an integral multiple of the block length.

11. The circuit for block encryption according to claim 9, wherein the encrypting means performs encryption after the plaintext data divided into blocks is subjected to an operation on the basis of the loaded initial value data or the previous block's encrypted data.

12. A circuit for block decryption comprising:
   a memory for storing encrypted data;
   an initial value memory storing an initial value;
   a register storing a mode indication indicating a mode of encryption executed on the encrypted data and an initial value flag indicating whether a block of the plaintext data is an initial block;
   a data control circuit including an exclusive-OR circuit that receives the initial value from the initial value memory and a latch that receives the mode indication and the initial value flag from the register;
   a decrypting circuit decrypting the encrypted data stored in the memory in blocks based on the initial value, the mode indication, and the initial value flag, received at the data control circuit, and transferring the data that is decrypted from the encrypted data to the memory in blocks; and
   outputting means for externally outputting the decrypted data when the data that is decrypted in blocks and is transferred to the memory reaches a predetermined size exceeding the block length.

13. The circuit for block decryption according to claim 12, wherein the predetermined size is an integral multiple of the block length.

14. The circuit for block decryption according to claim 12, wherein the decrypting means performs decryption after the encrypted data divided into blocks is subjected to an operation on the basis of a the loaded initial value data or the previous block's decrypted data.

15. An apparatus for block encryption comprising:
a first memory for storing plaintext data;
a second memory for storing the data transferred from the first memory;
an initial value memory storing an initial value;
a register storing a mode indication indicating a mode of encryption to be executed on the plaintext data and an initial value flag indicating whether a block of the plaintext data is an initial block;
a data control circuit including an exclusive-OR circuit that receives the initial value from the initial value memory and a latch that receives the mode indication and the initial value flag from the register;
an encrypting circuit encrypting the plaintext data stored in the second memory in blocks based on the initial value, the mode indication, and the initial value flag, received at the data control circuit, and transferring the encrypted data to the second memory in blocks; and
controlling means for transferring the encrypted data to the first memory when the data that is encrypted in blocks and is transferred to the second memory reaches a predetermined size exceeding the block length.

16. An apparatus for block decryption comprising:
a first memory for storing encrypted data;
a second memory for storing the encrypted data transferred from the first memory;
an initial value memory storing an initial value;
a register storing a mode indication indicating a mode of encryption executed on the encrypted data and an initial value flag indicating whether a block of the plaintext data is an initial block;
a data control circuit including an exclusive-OR circuit that receives the initial value from the initial value memory and a latch that receives the mode indication and the initial value flag from the register;
a decrypting circuit decrypting the encrypted data stored in the second memory in blocks based on the initial value, the mode indication, and the initial value flag, received at the data control circuit, and transferring the decrypted data to the second memory in blocks; and
controlling means for transferring the decrypted data to the first memory when the data that is decrypted in blocks and is transferred to the second memory reaches a predetermined size exceeding the block length.

* * * * *